Feb. 1, 1949.                J. L. CLARKSON                2,460,447
                              CONVEYER CHAIN
                         Original Filed April 4, 1945
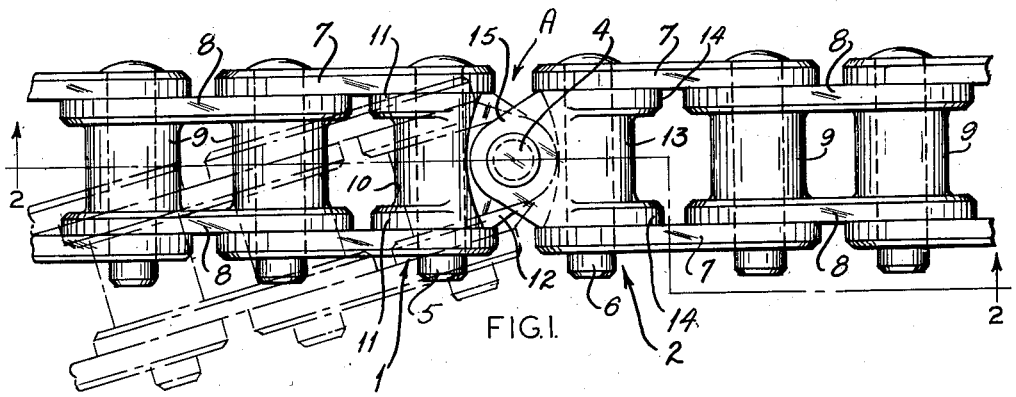
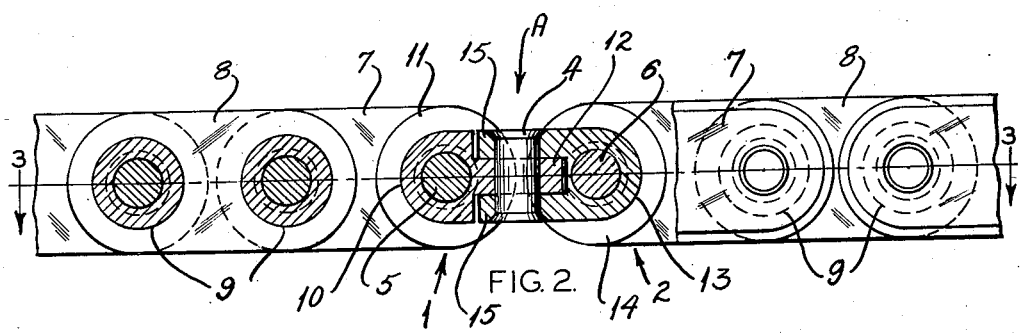
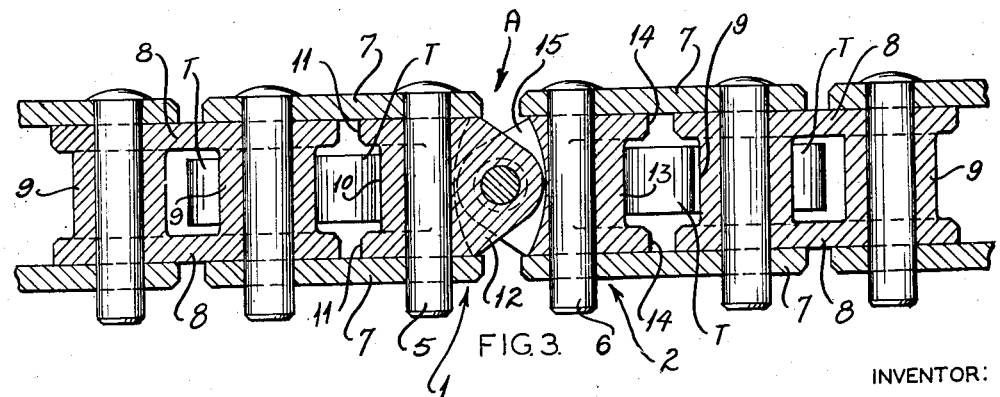
INVENTOR:
JOHN L. CLARKSON
BY *Rodney Bedell*
                 ATTORNEY.

Patented Feb. 1, 1949

2,460,447

UNITED STATES PATENT OFFICE 2,460,447

CONVEYER CHAIN

John L. Clarkson, Nashville, Ill.

Original application April 4, 1945, Serial No. 586,559. Divided and this application August 21, 1946, Serial No. 691,956

4 Claims. (Cl. 74—246)

The invention relates to conveyor chains and comprises novel features of universal joint structure for such chain. This application is a division of a copending application Serial No. 586,559, filed April 4, 1945 by the present applicant, now Patent No. 2,450,501, Oct. 5, 1948.

One object of the invention is to prolong the useful life of chains of the type described without increasing their overall width or thickness which would require change in the driving and other associated mechanisms.

Another object is to simplify the construction of chains of the type described.

These and other detail objects as will be apparent from the following description are attained by the structure illustrated in the accompanying drawings, in which—

Figure 1 is a top view of adjacent aligned sections of conveyor chain connected by a universal joint, one of the sections being shown in inclined position in broken lines.

Figure 2 is a longitudinal vertical section and elevation taken on the line 2—2 of Figure 1, and Figure 3 is a longitudinal horizontal section taken on the line 3—3 of Figure 2.

The chain assembly may include one or more universal joint units A. Upright pins 4 pivotally connect the two elements 1 and 2 of the unit. Elements 1 and 2 are pivotally connected by horizontal pins 5 and 6 respectively to chain links 7 which, with cooperating links 8 and rollers 9, form ordinary chain structure between successive universal joint units.

Element 1 has a central longitudinal portion 10 of relatively shallow depth and side flanges 11 or relatively greater depth. One end of portion 10 is rounded and apertured axially of its rounding to form a sleeve to receive a pin 5 and the other end of portion 10 is flattened to form a tongue 12. Flanges 11 project upwardly and downwardly and outwardly of the rounded end and terminate a substantial distance inwardly from the outer end of tongue 12.

Element 2 has a central longitudinal portion 13 of relatively shallow depth and side flanges 14 of relatively greater depth and one end of portion 13 is rounded and apertured axially of its rounding to form a sleeve to receive pin 6. In these respects the elements correspond. The other end of portion 13 is slotted to form spaced jaws 15, adapted to receive between them tongue 12 of associated element 1. Flanges 14 project upwardly and downwardly and outwardly of the rounded end and terminate a substantial distance inwardly from the outer ends of jaws 15. Tongue 12 and jaws 15 are apertured for pin 4 which has its axis extending in a direction transversely of the axis of pin 5.

Preferably, but not essentially, elements 1 and 2 have the same overall width as rollers 9 plus links 8, and the elements (and universal joint unit) are thereby adapted for ready assembly with intermediate lengths of ordinary standard conveyor chain. Flanges 11 and 14 of elements 1 and 2 have the same depth as links 7 and 8 and the unit readily fits over a sprocket wheel tooth T. Elements 1 and 2, although forming a universal joint structure, are equivalent in strength to the intermediate ordinary standard chain link structure and are not subject to failure as are interconnected elements frequently used in universal joints. The flanges at the sides of the elements provide large, flat, direct contacts or seats to which flights or other parts may be attached. Thus play between these parts is reduced, resulting in less wear and longer useful life of the assembly.

Obviously, it will not be essential that all the details of construction be present in every embodiment of the invention, and the details may be varied without departing from the spirit of the invention. The exclusive use of modifications coming within the scope of the claims is contemplated.

What is claimed is:

1. In a conveyor chain universal joint structure, a pair of elements arranged end to end, each having a central longitudinal portion of relatively shallow depth and flanges of relatively greater depth at the sides of said portion, the central longitudinal portion of one element forming spaced jaws and the central longitudinal portion of the other element having a tongue received between said jaws, and a pin extending through the tongue and jaws parallel to the planes of said flanges and pivotally connecting the two elements.

2. In a conveyor chain universal joint structure, a pair of elements arranged end to end, each having a central longitudinal portion of relatively shallow depth and flanges of relatively greater depth at the sides of said portion, the elements having substantially the same overall width and substantially the same depth of flanges, the central longitudinal portion of one element forming spaced jaws and the central longitudinal portion of the other element having a tongue received between said jaws, and a pin extending through the tongue and jaws parallel to the planes of said flanges and pivotally connecting the two elements.

3. A conveyor chain universal joint element having a relatively thick end rounded to engage a sprocket tooth and apertured in one direction axially of its rounding to form a sleeve to receive a pin for pivotally connecting the element to a chain link and having a relatively thin flattened end forming a tongue paralleling said sleeve and apertured in a direction normal to its flat faces to receive a pin for pivotally connecting the element to an associated rounded end, there being flanges at the sides of the element extending normally to the flat faces.

4. A conveyor chain universal joint with one end rounded to engage a sprocket tooth and apertured in one direction axially of its rounding to form a sleeve to receive a pin for pivotally connecting the element to a chain link and with its other end forming spaced flat jaws apertured in a direction normal to their flat faces to receive a pin for pivotally connecting the element to an associated element, there being flanges at the sides of the rounded end extending normally to the flat faces.

JOHN L. CLARKSON.

REFERENCES CITED

The following references are of record in the file of this patent:

UNITED STATES PATENTS

| Number | Name | Date |
| --- | --- | --- |
| 570,213 | Amborn, Jr. | Oct. 27, 1896 |
| 594,416 | McCormick | Nov. 30, 1897 |